US010928137B2

(12) United States Patent
Sakakura et al.

(10) Patent No.: US 10,928,137 B2
(45) Date of Patent: Feb. 23, 2021

(54) PRESSURE VESSEL

(71) Applicant: IHI CORPORATION, Tokyo (JP)

(72) Inventors: Shigeki Sakakura, Tokyo (JP); Nobuyuki Honma, Tokyo (JP); Toshiyuki Sakata, Tokyo (JP); Kohei Tsurugaya, Tokyo (JP); Daisuke Tsunoda, Tokyo (JP)

(73) Assignee: IHI CORPORATION, Tokyo (JP)

( * ) Notice: Subject to any disclaimer, the term of this patent is extended or adjusted under 35 U.S.C. 154(b) by 68 days.

(21) Appl. No.: 16/293,775

(22) Filed: Mar. 6, 2019

(65) Prior Publication Data

US 2019/0195565 A1    Jun. 27, 2019

Related U.S. Application Data

(63) Continuation of application No. PCT/JP2017/037026, filed on Oct. 12, 2017.

(30) Foreign Application Priority Data

Oct. 13, 2016 (JP) .............................. JP2016-201664

(51) Int. Cl.
*F28D 1/06* (2006.01)
*F16J 13/10* (2006.01)
*F16J 12/00* (2006.01)

(52) U.S. Cl.
CPC ................ F28D 1/06 (2013.01); F16J 13/10 (2013.01); *F16J 12/00* (2013.01)

(58) Field of Classification Search
CPC ........ F28D 1/06; F28D 7/1615; F28D 9/0006; F16J 12/00; F16J 13/10; F16J 13/12
(Continued)

(56) References Cited

U.S. PATENT DOCUMENTS 1,813,754 A * 7/1931 Metzgar ................. F04B 39/06
                                                        55/434.4
1,987,891 A * 1/1935 Cattanach ............. F28D 7/0058
                                                        165/11.1
(Continued)

FOREIGN PATENT DOCUMENTS

CN      105582773 A     5/2016
JP      S58-010583 U1   1/1983
(Continued)

OTHER PUBLICATIONS

European Patent Office, "Extended European Search Report", issued in European Patent Application No. 17 859 610.2, which is a European counterpart of U.S. Appl. No. 16/293,775, dated May 12, 2020, 7 pages.

*Primary Examiner* — Devon Russell

(57) ABSTRACT

A pressure vessel includes a pressure vessel body provided with a flow channel through which a fluid is caused to flow, having a rectangular cross-sectional shape, and formed in an elongated shape, and a circular body flange provided on at least one longitudinal end side of the pressure vessel body, the pressure vessel body has a fluid inlet-outlet port which is provided on the one longitudinal end side and the body flange side of the pressure vessel body and connects with the flow channel and through which the fluid is caused to flow in or out, and the pressure vessel further includes an inlet-outlet header which is formed between the pressure vessel body and the body flange as a closed space connecting with the fluid inlet-outlet port and which the fluid is caused to flow into and out of.

6 Claims, 9 Drawing Sheets

(58) Field of Classification Search
USPC .................................................. 165/157, 158
See application file for complete search history.

(56) References Cited

U.S. PATENT DOCUMENTS

| | | | | |
|---|---|---|---|---|
| 2,505,695 | A * | 4/1950 | Villiger | F28F 9/0135 165/162 |
| 2,941,787 | A * | 6/1960 | Ramen | F28D 9/0006 165/157 |
| RE25,808 | E * | 6/1965 | Amorosi | G21C 1/16 165/11.1 |
| 3,267,906 | A * | 8/1966 | Deighton | G21C 1/326 122/32 |
| 3,572,429 | A * | 3/1971 | Myers | F28F 9/0241 165/82 |
| 3,610,330 | A * | 10/1971 | Nasser | F28D 7/16 165/158 |
| 3,720,071 | A * | 3/1973 | Nasser | B01D 5/0012 165/166 |
| 4,249,593 | A * | 2/1981 | Bieberbach | F22B 1/066 165/158 |
| 5,228,515 | A * | 7/1993 | Tran | F28D 9/0037 165/166 |
| 5,323,849 | A * | 6/1994 | Korczynski, Jr. | F28D 7/16 165/158 |
| 5,826,647 | A * | 10/1998 | Engelhardt | C09C 1/50 165/134.1 |
| 6,273,180 | B1 | 8/2001 | Joshi et al. | |
| 6,293,337 | B1 * | 9/2001 | Strahle | F28D 9/0037 165/166 |
| 2003/0010479 | A1 * | 1/2003 | Hayashi | F28F 3/025 165/157 |
| 2005/0034847 | A1 * | 2/2005 | Graham | F28F 21/04 165/158 |
| 2012/0103578 | A1 | 5/2012 | Taylor | |
| 2012/0210995 | A1 | 8/2012 | West | |
| 2014/0041840 | A1 * | 2/2014 | Moser | F28F 1/08 165/158 |
| 2015/0136366 | A1 * | 5/2015 | Fukui | F28D 7/005 165/148 |
| 2015/0285572 | A1 * | 10/2015 | Fleitling | F28F 3/025 165/167 |

FOREIGN PATENT DOCUMENTS

| | | |
|---|---|---|
| JP | 2000-193381 A | 7/2000 |
| JP | 2003-201923 A | 7/2003 |
| JP | 2012-525562 A | 10/2012 |
| JP | 2013-508150 A | 3/2013 |
| JP | 2014-166603 A | 9/2014 |
| JP | 5623715 B2 | 11/2014 |

* cited by examiner

PRESSURE VESSEL

CROSS REFERENCE TO RELATED APPLICATIONS

This application is a continuation application of International Application No. PCT/JP2017/037026, filed on Oct. 12, 2017, which claims priority to Japanese Patent Application No. 2016-201664, filed on Oct. 13, 2016, the entire contents of which are incorporated by references herein.

BACKGROUND

1. Field

The present disclosure relates to a pressure vessel.

2. Description of the Related Art

In pressure vessels such as reactors and heat exchangers, heat exchange is performed between a primary fluid and a secondary fluid for production of a reacted product, heating, cooling, and so on. A pressure vessel configured as a heat exchanger is described in Published Japanese Translation of PCT International Application No. 2012-525562 (Patent Literature 1).

SUMMARY

Meanwhile, conventional pressure vessels such as reactors and heat exchangers include a shell part provided with flow channels through which fluids are caused to flow, and a shell flange provided on at least one longitudinal end side of the shell part. The shell parts of the pressure vessels are provided with headers which the fluids are caused to flow into and out of. These pressure vessels are usually installed at plants and the like, and there has been a demand to make the pressure vessels smaller to make the plants and the like compact.

In view of this, an object of the present disclosure is to provide a pressure vessel that can be made smaller.

A pressure vessel according to an embodiment of the present disclosure includes a pressure vessel body provided with a flow channel through which a fluid is caused to flow, having a rectangular cross-sectional shape, and formed in an elongated shape; and a circular body flange provided on at least one longitudinal end side of the pressure vessel body, the pressure vessel body has a fluid inlet-outlet port which is provided on the one longitudinal end side and the body flange side of the pressure vessel body and connects with the flow channel and through which the fluid is caused to flow in or out, and the pressure vessel further includes an inlet-outlet header which is formed between the pressure vessel body and the body flange as a closed space connecting with the fluid inlet-outlet port and which the fluid is caused to flow into and out of.

In a pressure vessel according to an embodiment of the present disclosure, a plurality of the inlet-outlet headers are provided between the pressure vessel body and the body flange.

In a pressure vessel according to an embodiment of the present disclosure, the inlet-outlet header has paired lids on opposite sides thereof in a thickness direction of the body flange, the paired lids forming the closed space.

In a pressure vessel according to an embodiment of the present disclosure, at least one of the paired lids is formed to be openable and closable.

The pressure vessel with the above configuration need not mount any header which the fluid is caused to flow into and out of inside the pressure vessel body and the pressure vessel body therefore does not need any region to mount a header therein. In this way, the configuration of the pressure vessel body can be made smaller. Accordingly, the pressure vessel can be made smaller.

DESCRIPTION OF EMBODIMENTS

Embodiments of the present disclosure will be described below in detail by using the drawings.

First Embodiment

Figure 1:
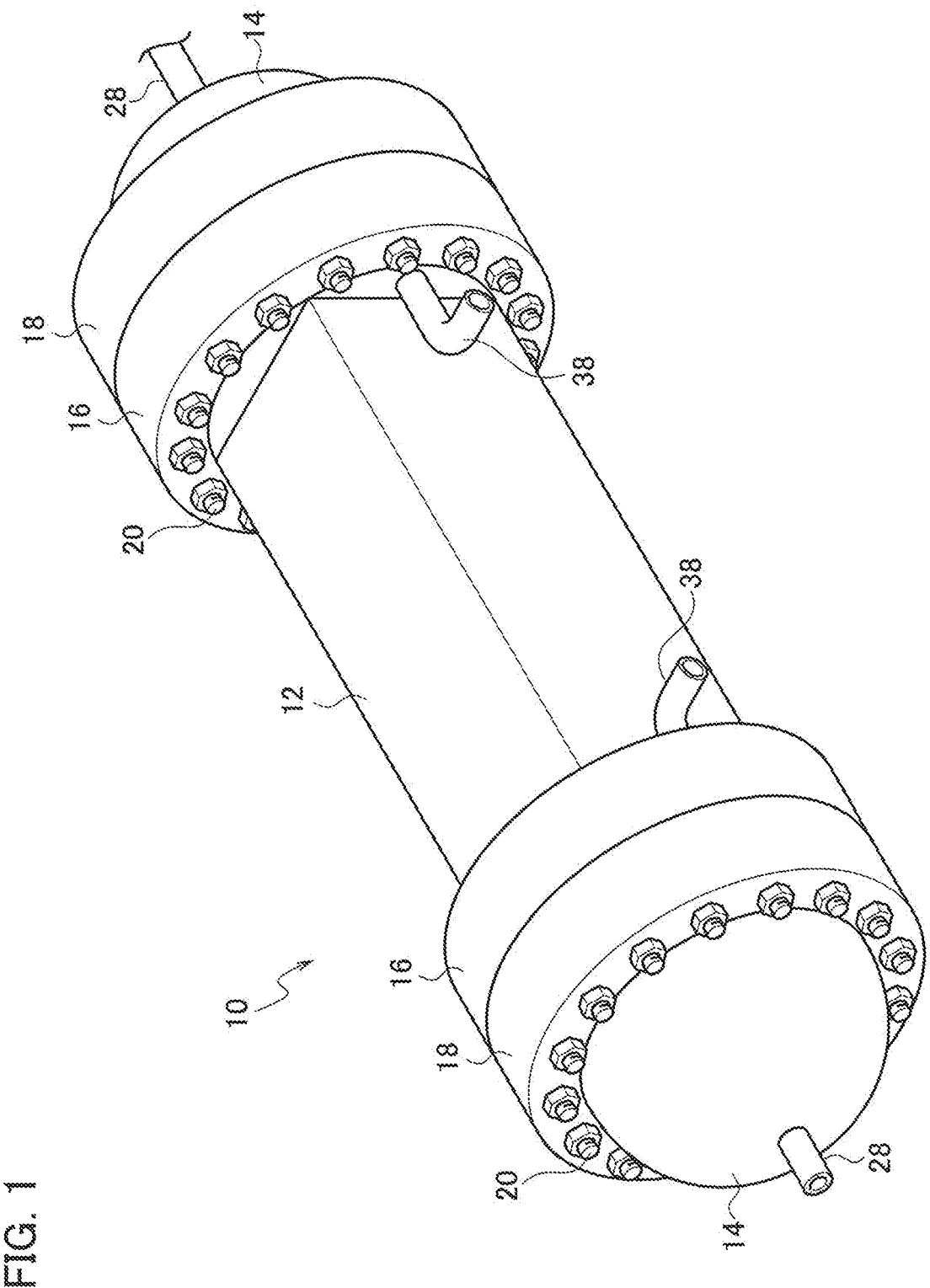
FIG. 1 is a schematic view illustrating the configuration of a pressure vessel in a first embodiment of the present disclosure.
Figure 2:
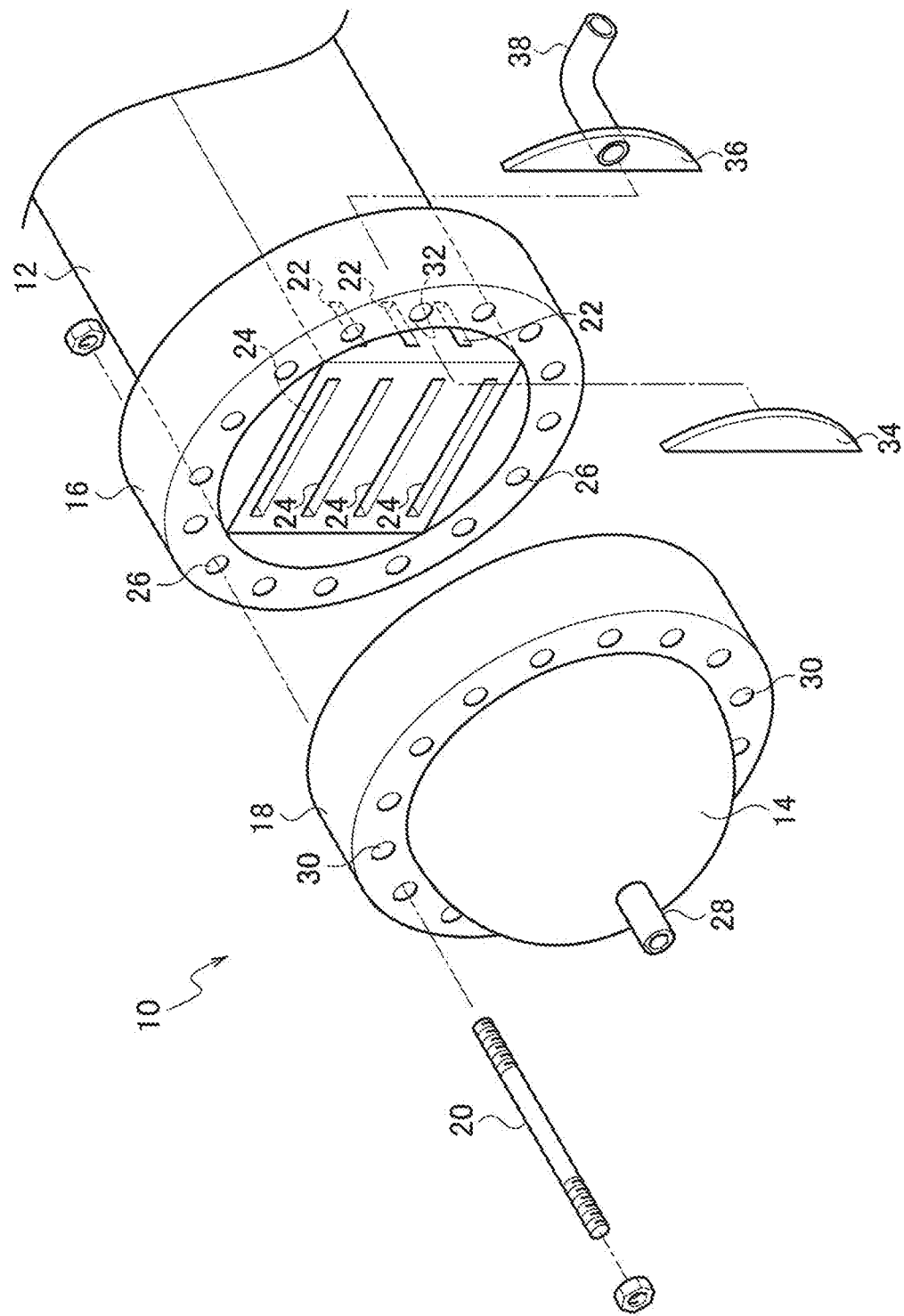
FIG. 2 is a detailed view illustrating the configuration of the pressure vessel in the first embodiment of the present disclosure.

A first embodiment of the present disclosure will be described in detail by using drawings. FIG. 1 is a schematic view illustrating the configuration of a pressure vessel 10. FIG. 2 is a detailed view illustrating the configuration of the pressure vessel 10. The pressure vessel 10 is configured as a reactor, a heat exchanger, or the like, for example.

The pressure vessel 10 includes a pressure vessel body 12 and at least one lid member 14 provided on the pressure vessel body 12. The pressure vessel 10 has a body flange 16 provided on at least one longitudinal end side of the pressure vessel body 12. The body flange 16 may be provided on the opposite longitudinal end sides of the pressure vessel body 12. The pressure vessel 10 has a lid flange 18 provided to the lid member 14. The body flange 16 and the lid flange 18 are fastened to each other with fastening members such as bolts 20 so as to be openable and closable. Note that the lid member 14 may be provided on the opposite sides of the pressure vessel body 12.

The pressure vessel body 12 has a rectangular cross-sectional shape and is formed in an elongated shape. The pressure vessel body 12 is formed in a cuboidal shape or the like, for example. The pressure vessel body 12 is made of stainless steel, a Ni (nickel) alloy, low-alloy steel, carbon steel, or the like. The pressure vessel body 12 has a first flow channel (not illustrated) through which a first fluid is caused to flow. The first flow channel may be provided as a single flow channel or provided as a plurality of flow channels. The first flow channel may be formed along the longitudinal direction of the pressure vessel body 12. The first flow channel may be formed in a straight shape or formed in a meandering shape.

The pressure vessel body 12 has a first-fluid inlet-outlet port 22 which is provided on the one longitudinal end side and the body flange 16 side of the pressure vessel body 12 and connects with the first flow channel and through which the first fluid is caused to flow in or out. More specifically, the pressure vessel body 12 has a first-fluid inlet-outlet port 22 in a side surface of the one longitudinal end side of the pressure vessel body 12 through which the first fluid is caused to flow in or out. The first-fluid inlet-outlet port 22 is formed to connect with the first flow channel. It suffices that at least one first-fluid inlet-outlet port 22 be provided, but a plurality of first-fluid inlet-outlet ports 22 may be provided. As an example, three first-fluid inlet-outlet ports 22 are provided on the one longitudinal end side of the pressure vessel body 12, as illustrated in FIG. 2.

The pressure vessel body 12 may have a second flow channel (not illustrated) through which a second fluid is caused to flow. The second flow channel is formed separate from each first flow channel so that the first fluid and the second fluid will not mix with each other. The second flow channel may be provided as a single flow channel or provided as a plurality of flow channels. The second flow channel may be formed along the longitudinal direction of the pressure vessel body 12. The second flow channel may be formed in a straight shape or formed in a meandering shape.

The pressure vessel body 12 has a second-fluid inlet-outlet port 24 in the end surface of the one longitudinal end side of the pressure vessel body 12 through which the second fluid is caused to flow in or out. The second-fluid inlet-outlet port 24 is formed to connect with the second flow channel. It suffices that at least one second-fluid inlet-outlet port 24 be provided, but a plurality of second-fluid inlet-outlet ports 24 may be provided. As an example, four second-fluid inlet-outlet ports 24 are provided on the one longitudinal end side of the pressure vessel body 12, as illustrated in FIG. 2.

Catalyst members, fins, and so on may be inserted in the first flow channels and the second flow channels. The first fluid and the second fluid may be caused to flow in the same direction (so-called co-current configuration) or in the opposite directions (so-called countercurrent configuration). As the first fluid and the second fluid, reactive fluids of organic compounds or the like, high-temperature gases such as combustion gases, and heating media such as water and coolants are usable, for example.

In the case where the pressure vessel 10 is a reactor, a reactive fluid is used as the first fluid and a heating medium is used as the second fluid, for example. The first fluid is heated or cooled via heat exchange between the first fluid and the second fluid. As a result, the first fluid, which is a reactive fluid, is reacted and a product can be produced.

The body flange 16 is provided at least on one longitudinal end side of the pressure vessel body 12. The body flange 16 is formed in a circular shape. The body flange 16 includes an opening portion formed as a through hole. The opening portion of the body flange 16 has a space in which the pressure vessel body 12 can be inserted and a space in which a later-described inlet-outlet header 32 can be formed. Although the shape of the opening portion of the body flange 16 is not particularly limited, it may be formed in a circular shape, for example. In the periphery of the body flange 16, the body flange 16 has fastening holes 26 for fastening it to the lid flange 18 with fastening members such as the bolts 20. The body flange 16 is made of stainless steel, a Ni alloy, low-alloy steel, carbon steel, or the like. The body flange 16 is joined to the pressure vessel body 12 by welding or the like. In the case of welding the body flange 16 and the pressure vessel body 12, they may be welded along the circumferential direction of the pressure vessel body 12 or welded along the thickness direction of the body flange 16.

The lid member 14 is formed in the shape of a dome or the like. The lid member 14 is provided with a nozzle 28 which connects with the inside of the lid member 14 and through which the second fluid is caused to flow in or out. The nozzle 28 may function as an inlet nozzle through which the second fluid is caused to flow in or function as an outlet nozzle through which the second fluid is caused to flow out. In the case where the nozzle 28 functions as an inlet nozzle, the second fluid having flowed in from the nozzle 28 is introduced into the second flow channels from the second-fluid inlet-outlet ports 24 of the pressure vessel body 12. Also, in the case where the nozzle 28 functions as an outlet nozzle, the second fluid having flowed out from the second-fluid inlet-outlet ports 24 of the pressure vessel body 12 is discharged from the nozzle 28 of the lid member 14. The lid member 14 is made of stainless steel, a Ni alloy, low-alloy steel, carbon steel, or the like.

The lid flange 18 is provided on the pressure vessel body 12 side of the lid member 14. The lid flange 18 is joined to the lid member 14 by welding or the like. In the periphery of the lid flange 18, the lid flange 18 has fastening holes 30 for fastening it to the body flange 16 with fastening members such as the bolts 20. The lid flange 18 is made of stainless steel, a Ni alloy, low-alloy steel, carbon steel, or the like.

The pressure vessel 10 includes an opening and closing structure having the body flange 16 and the lid flange 18. With this opening and closing structure, inspection, repair, and so on of the pressure vessel 10 can be performed in an opened state.

Figure 3:
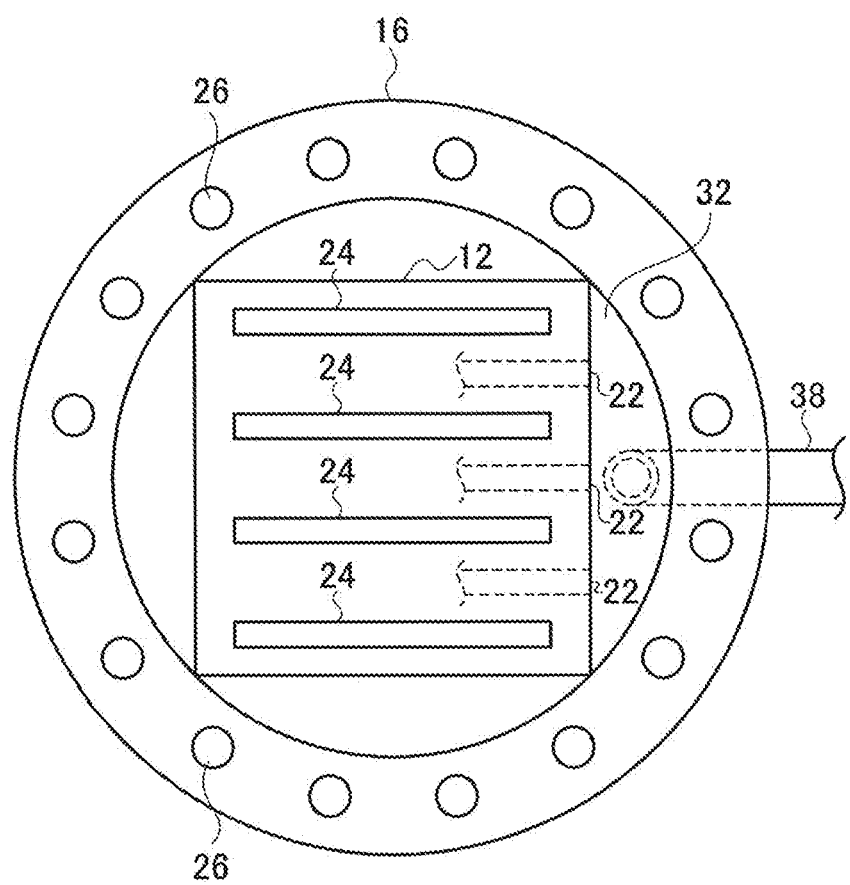
FIG. 3 is a view for explaining an inlet-outlet header in the first embodiment of the present disclosure.
Figure 4:
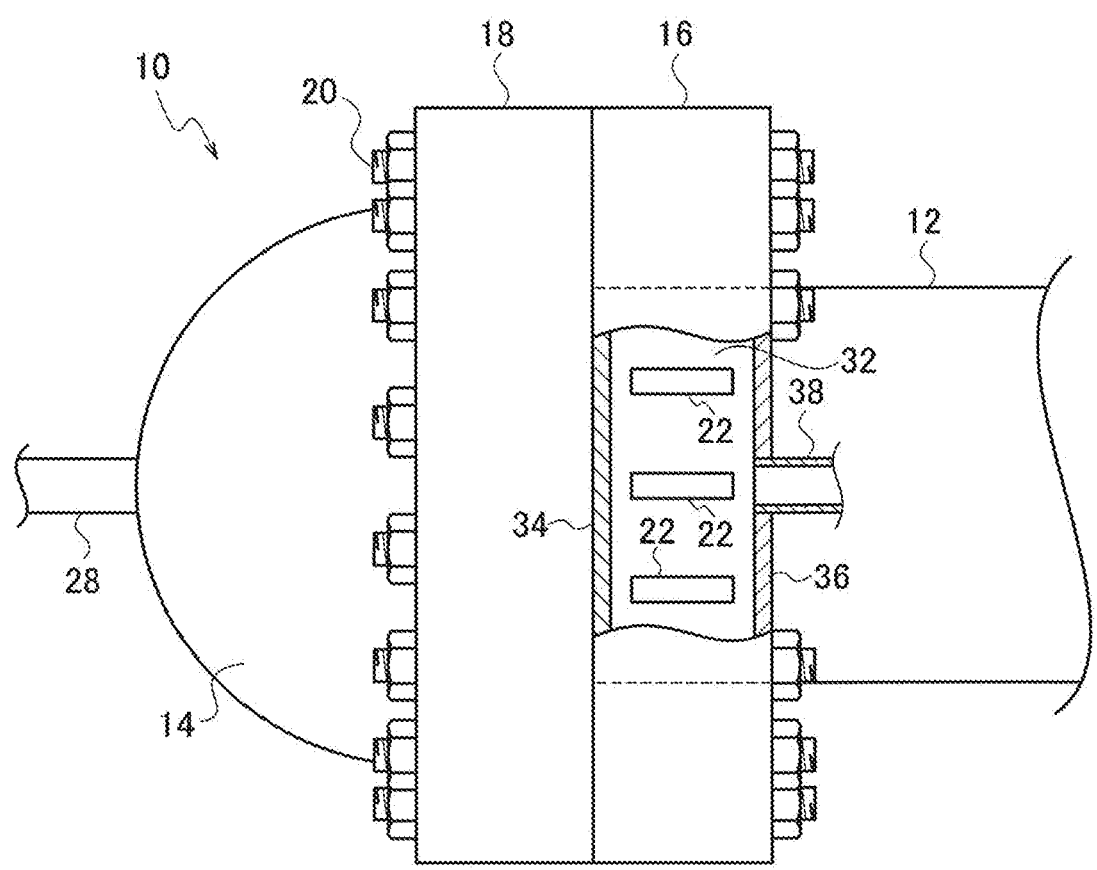
FIG. 4 is a view for explaining the inlet-outlet header in the first embodiment of the present disclosure.

The pressure vessel 10 has the inlet-outlet header 32, which the first fluid is caused to flow into and out of. FIGS. 3 and 4 are views for explaining the inlet-outlet header 32. The pressure vessel 10 has the inlet-outlet header 32, which is formed between the pressure vessel body 12 and the body flange 16 as a closed space connecting with the first-fluid inlet-outlet ports 22 and which the first fluid is caused to flow into and out of. The inlet-outlet header 32 may function as an outlet header through which to discharge the first fluid or function as an inlet header through which to introduce the first fluid.

The inlet-outlet header 32 may have paired lids 34 and 36 for forming the closed space on its opposite sides in the thickness direction of the body flange 16. The inlet-outlet header 32 is formed as a tightly closed space surrounded by the outer surface of the pressure vessel body 12, the inner surface of the body flange 16, and the paired lids 34 and 36. The entire edges of the paired lids 34 and 36 may be joined to the pressure vessel body 12 and the body flange 16 by welding or the like. The paired lids 34 and 36 are an inner lid 34 and an outer lid 36. The inner lid 34 and the outer lid 36 are made of stainless steel, a Ni alloy, low-alloy steel, carbon steel, or the like.

The inner lid 34 has the function of separating the first fluid-side and the second fluid-side from each other to prevent mixing of the first fluid and the second fluid. The inner lid 34 may be formed in the shape of a flat plate to prevent interference with the lid flange 18. For example, the inner lid 34 is formed as a circular segment plate.

The outer lid 36 has the function of separating the inlet-outlet header 32 and the outside of the pressure vessel 10 from each other to prevent leakage of the first fluid to the outside of the pressure vessel 10. The outer lid 36 may be formed in a plate shape such as a circular segment plate shape or in a dome shape bulging toward the outside of the pressure vessel 10. In the case where the outer lid 36 is formed in a dome shape bulging toward the outside of the pressure vessel 10, the outer lid 36 can receive pressure more evenly.

The outer lid 36 has a nozzle 38 provided to the back surface of the outer lid 36 and connecting with the inlet-outlet header 32. The nozzle 38 is joined to the outer lid 36 by welding or the like. The nozzle 38 is connected to already installed piping or the like (not illustrated), for example. The first fluid can flow into or out of the inlet-outlet header 32 through the nozzle 38 of the outer lid 36.

By providing the inlet-outlet header 32 as above between the pressure vessel body 12 and the body flange 16, the pressure vessel body 12 does not need any regions to mount headers therein, which allows the configuration of the pressure vessel body 12 to be smaller. Accordingly, the pressure vessel 10 can be made smaller. Further, in the case where the pressure vessel 10 is a reactor or a heat exchanger, substantially the entire pressure vessel body 12 in the longitudinal direction can be used for the heat exchange between the first fluid and the second fluid. Furthermore, since the configuration of the pressure vessel body 12 can be made smaller, the material cost of the pressure vessel body 12 can be reduced.

Figure 5:
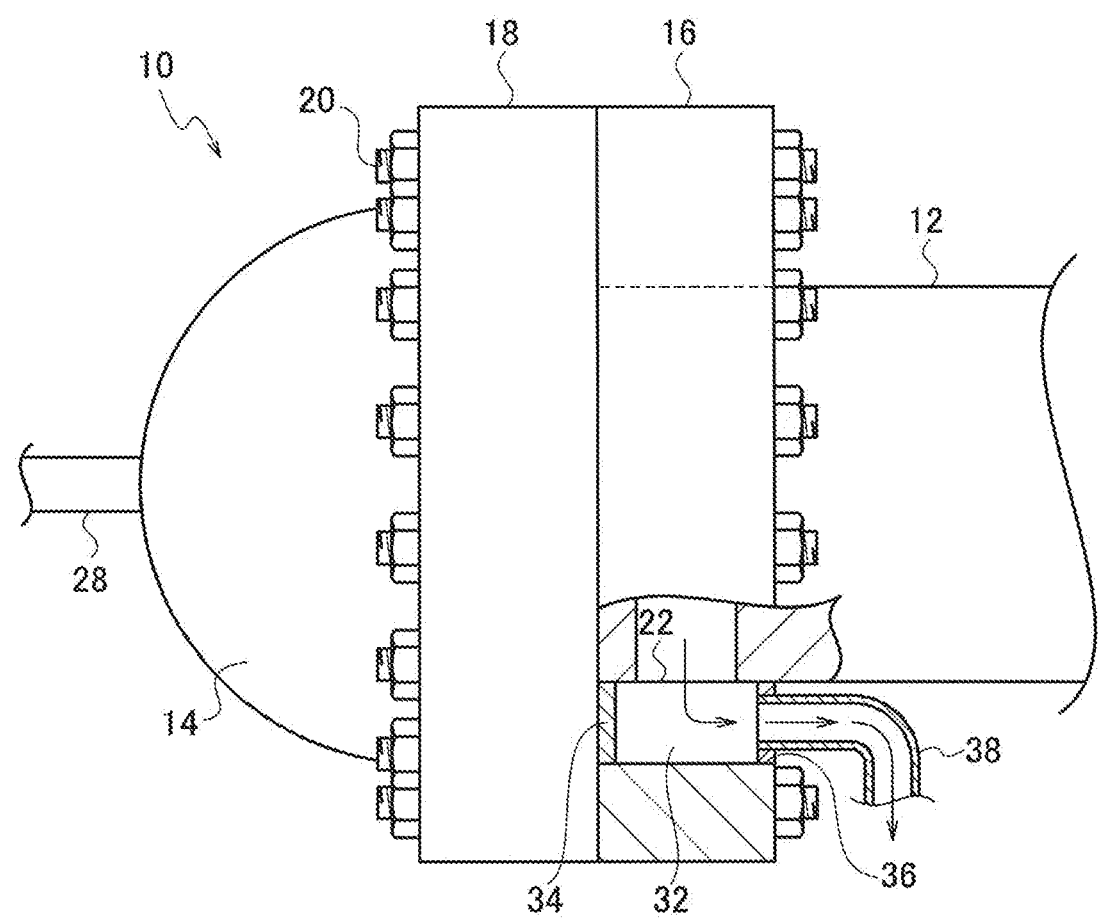
FIG. 5 is a view for explaining the operation of the pressure vessel in the first embodiment of the present disclosure.
Figure 6:
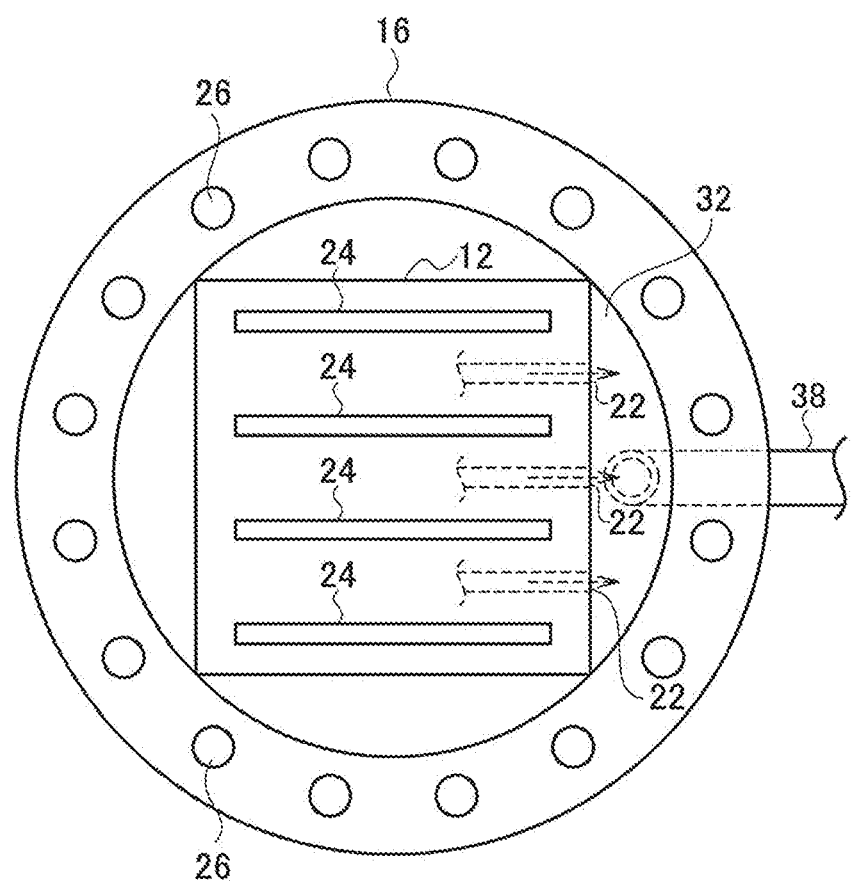
FIG. 6 is a view for explaining the operation of the pressure vessel in the first embodiment of the present disclosure.

Next, the operation of the pressure vessel 10 will be described. FIGS. 5 and 6 are views for explaining the operation of the pressure vessel 10. Note that the arrows illustrated in FIGS. 5 and 6 indicate the direction of flow of the first fluid. First, the description will be given with the case where the inlet-outlet header 32 functions as an outlet header. The first fluid is discharged from the first-fluid inlet-outlet ports 22 of the pressure vessel body 12. The flows of the first fluid discharged from the first-fluid inlet-outlet ports 22 join at the inlet-outlet header 32. The flows of the first fluid having joined at the inlet-outlet header 32 are then discharged from the nozzle 38 of the outer lid 36.

Next, the description will be given with the case where the inlet-outlet header 32 functions as an inlet header. The first fluid having flowed in from the nozzle 38 of the outer lid 36 is then introduced into the inlet-outlet header 32. The first fluid introduced into the inlet-outlet header 32 is then introduced into the pressure vessel body 12 from the first-fluid inlet-outlet ports 22.

The pressure vessel with the above configuration is provided with an inlet-outlet header between its pressure vessel body and body flange which a fluid is caused to flow into and out of. Therefore, the pressure vessel body does not need any regions to mount headers therein, which allows the length of the pressure vessel body to be smaller and thus allows the configuration of the pressure vessel body to be smaller. Accordingly, the pressure vessel 10 can be made smaller and lighter. Also, since the configuration of the pressure vessel body can be made smaller, the material cost and the like of the pressure vessel body can be reduced and thus the manufacturing cost of the pressure vessel can be reduced.

Second Embodiment

Figure 7:
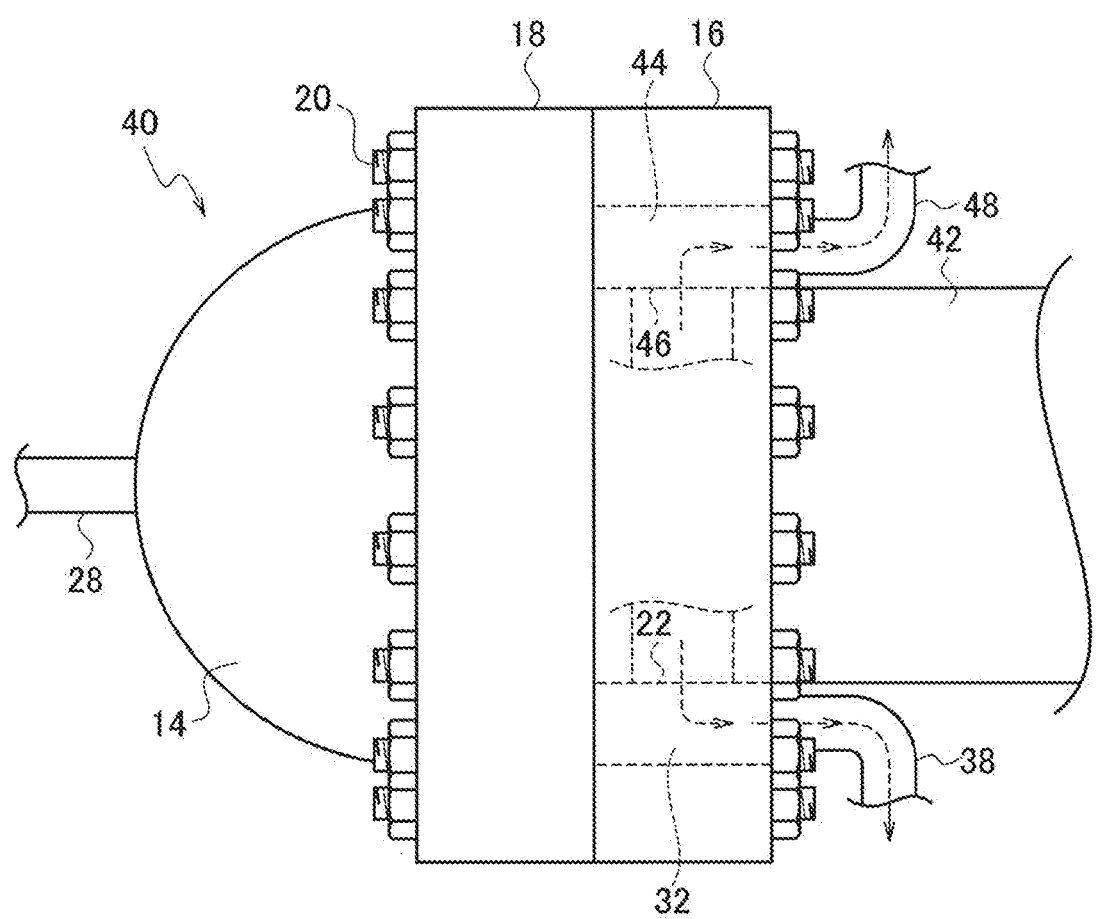
FIG. 7 is a schematic view illustrating the configuration of a pressure vessel in a second embodiment of the present disclosure.
Figure 8:
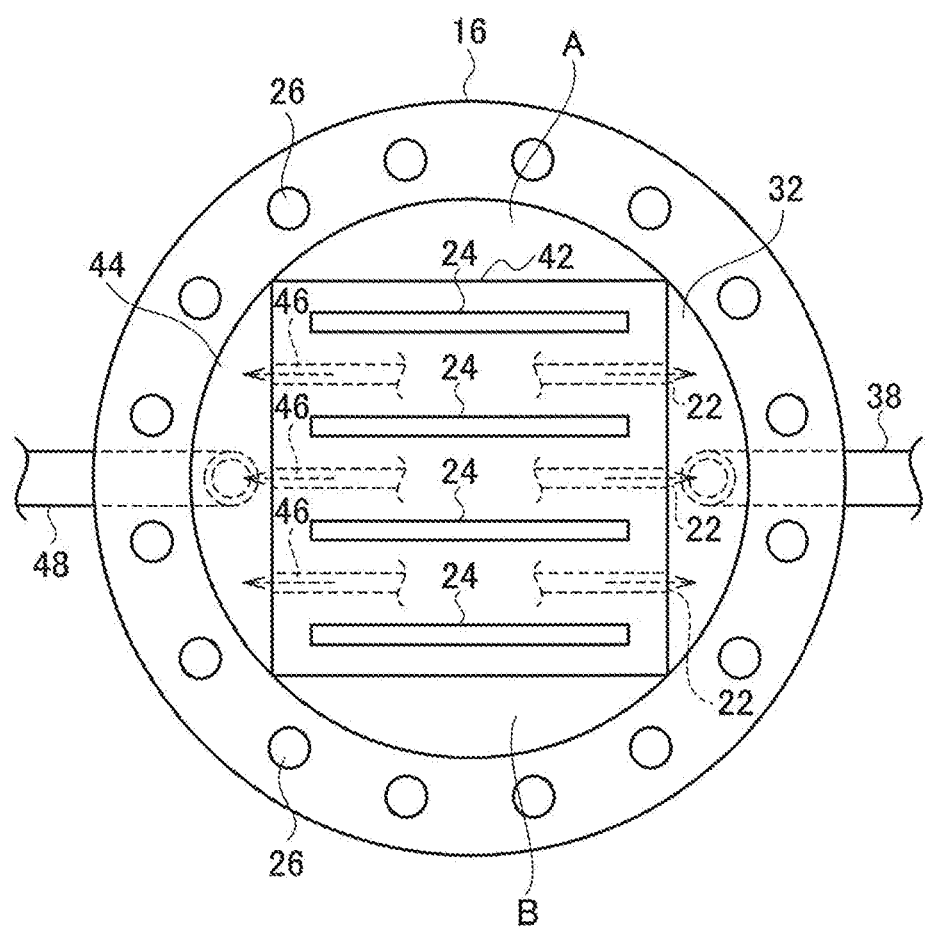
FIG. 8 is a view for explaining the operation of the pressure vessel in the second embodiment of the present disclosure.

Next, a second embodiment of the present disclosure will be described in detail by using drawings. FIG. 7 is a view illustrating the configuration of a pressure vessel 40. FIG. 8 is a view for explaining the operation of the pressure vessel 40. The arrows illustrated in FIGS. 7 and 8 indicate the direction of flow of the first fluid. Note that similar components are denoted by the same reference signs, and detailed description thereof is omitted. The pressure vessel 40 in the second embodiment differs from the pressure vessel 10 in the first embodiment in that a plurality of inlet-outlet headers 32 and 44 are provided between a pressure vessel body 42 and the body flange 16.

The pressure vessel 40 has the plurality of inlet-outlet headers 32 and 44 between the pressure vessel body 42 and the body flange 16. The pressure vessel 40 illustrated in FIGS. 7 and 8 have two inlet-outlet headers 32 and 44 between the pressure vessel body 42 and the body flange 16. The two inlet-outlet headers 32 and 44 are formed on opposite sides of the pressure vessel body 42. The pressure vessel body 42 has first-fluid inlet-outlet ports 22 and 46 which are provided on one longitudinal end side and the body flange 16 side of the pressure vessel body 42 and connect with the first flow channels and through which the first fluid is caused to flow in or out. More specifically, the pressure vessel body 42 has first-fluid inlet-outlet ports 22 and 46 in opposite side surfaces of the one longitudinal end side of the pressure vessel body 42 through which the first fluid is caused to flow in or out. One of the inlet-outlet headers, namely, the inlet-outlet header 32 is formed as a closed space connecting with one of the sets of first-fluid inlet-outlet ports, namely, the first-fluid inlet-outlet ports 22. The other inlet-outlet header 44 is formed as a closed space connecting with the other set of first-fluid inlet-outlet ports 46.

By providing the plurality of inlet-outlet headers 32 and 44 as above, it is possible to cause the first fluid to flow into and out of the plurality of inlet-outlet headers 32 and 44. For example, the portions of the first fluid discharged from the first-fluid inlet-outlet ports 22 join at the inlet-outlet header 32 and are then discharged from a nozzle 38. Also, the portions of the first fluid discharged from the first-fluid inlet-outlet ports 46 join at the inlet-outlet header 44 and are then discharged from a nozzle 48.

The pressure vessel 40 may be provided with third flow channels through which a third fluid is caused to flow in the pressure vessel body 42 and use the other first-fluid inlet-outlet ports 46 as third-fluid inlet-outlet ports through which the third fluid is caused to flow in or out. In this case, it is possible to cause the first fluid to flow into and out of the one inlet-outlet header 32 and cause the third fluid to flow into and out of the other inlet-outlet header 44.

Further, by changing the flow channel configuration in the pressure vessel body 42, the pressure vessel 40 may be provided with an inlet-outlet header in another region or other regions between the pressure vessel body 42 and the body flange 16. More specifically, like regions A and B illustrated in FIG. 8, an inlet-outlet header may be further provided in any of regions between the pressure vessel body 42 and the body flange 16 present in a direction crossing a line connecting the one inlet-outlet header 32 and the other inlet-outlet header 44. In this way, three inlet-outlet headers or four inlet-outlet headers can be provided between the pressure vessel body 42 and the body flange 16.

The pressure vessel with the above configuration is provided with a plurality of inlet-outlet headers between its pressure Vessel body and body flange. Thus, in addition to achieving the effects of the first embodiment, the pressure vessel can cause a larger amount of fluid to flow in or out and use a larger number of types of fluids.

Third Embodiment

Figure 9:
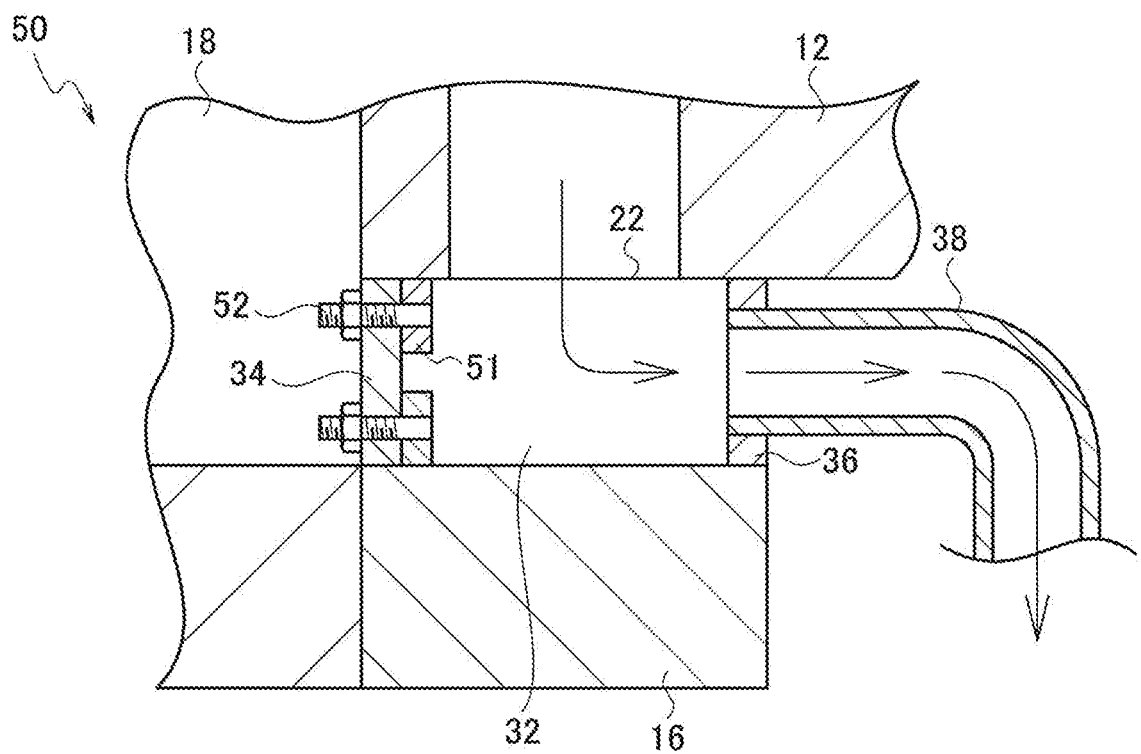
FIG. 9 is a schematic view illustrating the configuration of a pressure vessel in a third embodiment of the present disclosure.

Next, a third embodiment of the present disclosure will be described in detail by using a drawing. FIG. 9 is a view illustrating the configuration of a pressure vessel 50. Note that similar components are denoted by the same reference signs, and detailed description thereof is omitted. The pressure vessel 50 in the third embodiment differs from the pressure vessels 10 and 40 in the other embodiments in that at least one of paired lids 34 and 36 is formed to be openable and closable. Note that the arrows illustrated in FIG. 9 indicate the direction of flow of the first fluid.

In the pressure vessel 50 illustrated in FIG. 9, the inner lid 34 is formed to be openable and closable. More specifically, annular protrusions 51, for example, are mounted to the outer surface of the pressure vessel body 12 and the inner surface of the body flange 16 by welding or the like. Fastening members such as bolts 52 are mounted to the annular protrusions 51 by welding or the like. The inner lid 34 is fastened to the annular protrusions 51 so as to be openable and closable with the fastening members such as the bolts 52. Also, a seal member such as a gasket may be used to prevent leakage of the first fluid. With the above configuration, the inner lid 34 can be formed to be openable and closable. Hence, inspection and so on of the inlet-outlet header 32 can be performed in an opened state. In addition to the inner lid 34, the outer lid 36 may be similarly formed to be openable and closable, or only the outer lid 36 may be formed to be openable and closable.

Meanwhile, in the case where one of the inner lid 34 and the outer lid 36 is formed to be openable and closable, the inner lid 34 may be formed to be openable and closable for the following reason. The outer lid 36 separates the inside and the outside of the pressure vessel from each other, and therefore the pressure difference tends to be large between the opposite sides of the outer lid 36. Thus, the entire edge of the outer lid 36 may be welded to the outer surface of the pressure vessel body 12 and the inner surface of the body flange 16. On the other hand, the inner lid 34 separates the first fluid-side and the second fluid-side in the pressure vessel 50 from each other, and therefore the pressure difference tends to be small between the opposite sides of the inner lid 34.

In the pressure vessel with the above configuration, at least one of the paired lids at the inlet-outlet header is formed to be openable and closable. Thus, in addition to achieving the effects of the first and second embodiments, the pressure vessel allows inspection and so on of the inlet-outlet header to be performed in an opened state.

The present disclosure can reduce the size of a pressure vessel and is therefore useful for plants and the like.

What is claimed is:

1. A pressure vessel comprising:
    a pressure vessel body provided with a flow channel through which a fluid is caused to flow, having a rectangular cross-sectional shape, and formed in an elongated shape; and
    a circular body flange provided on at least one longitudinal end side of the pressure vessel body and including an opening portion formed of a through hole, the pressure vessel body being inserted in the body flange, wherein
    the pressure vessel body has a fluid inlet-outlet port which is provided in a side surface on the one longitudinal end side and provided on the body flange side of the pressure vessel body and connects with the flow channel and through which the fluid is caused to flow in or out,
    the pressure vessel further comprises an inlet-outlet header which is formed between an outer surface of the pressure vessel body and an inner surface of the body flange as a closed space connecting with the fluid inlet-outlet port and which the fluid is caused to flow into and out of, and
    the opening portion of the body flange has a space in which the pressure vessel body is insertable and a space in which the inlet-outlet header is formable.

2. The pressure vessel according to claim 1, wherein a plurality of the inlet-outlet headers are provided between the outer surface of the pressure vessel body and the inner surface of the body flange.

3. The pressure vessel according to claim 1, wherein the inlet-outlet header has paired lids on opposite sides thereof in a thickness direction of the body flange, the paired lids forming the closed space.

4. The pressure vessel according to claim 2, wherein the plurality of the inlet-outlet headers have paired lids on opposite sides thereof in a thickness direction of the body flange, the paired lids forming the closed space.

5. The pressure vessel according to claim 3, wherein at least one of the paired lids is formed to be openable and closable.

6. The pressure vessel according to claim 4, wherein at least one of the paired lids is formed to be openable and closable.

* * * * *